United States Patent Office 3,729,481
Patented Apr. 24, 1973

3,729,481
N¹-(SUBSTITUTED ACETOXYMETHYL)INDAZOLES
AND THEIR USE IN PESTICIDAL COMPOSITIONS
Pasquale P. Minieri, Woodside, N.Y., assignor to
Tenneco Chemicals, Inc.
No Drawing. Continuation-in-part of applications Ser. No. 589,235, Oct. 25, 1966, now Patent No. 3,637,736, dated Jan. 25, 1972, and Ser. No. 689,812, Dec. 12, 1967, now Patent No. 3,641,050, dated Feb. 8, 1972. This application May 24, 1971, Ser. No. 146,487
Int. Cl. C07d 49/18
U.S. Cl. 260—310 C                    5 Claims

ABSTRACT OF THE DISCLOSURE

Compounds that have the structural formula

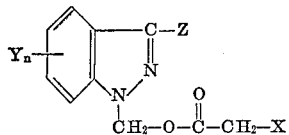

wherein X represents halogen or thiocyanato; Y represents halogen or nitro; Z represents halogen or hydrogen; and $n$ is an integer in the range of zero to 2 can be used to control the growth of various plant and animal pests. Among the most active of these compounds is N¹-thiocyanatoacetoxymethyl-6-nitroindazole.

---

This is a continuation-in-part of my copending application Ser. No. 589,235, which was filed on Oct. 25, 1966, and which is now U.S. Pat. No. 3,637,736, and my copending application Ser. No. 689,812, which was filed on Dec. 12, 1967 and which is now U.S. Pat. No. 3,641,050.

This invention relates to certain N¹-(substituted acetoxymethyl)indazoles and to the use of these compounds in the control of various plant and animal pests.

In accordance with this invention, it has been discovered that certain N¹-(substituted acetoxymethyl)indazoles are useful as fungicides and as herbicides. These compounds may be represented by the structural formula

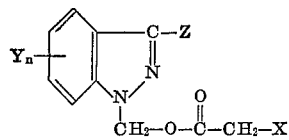

wherein X represents chlorine, bromine, fluorine, iodine, or thiocyanato; Y represents chlorine, bromine, fluorine, iodine, or nitro; Z represents hydrogen, chlorine, bromine, fluorine, or iodine; and $n$ represents an integer in the range of zero to 2.

Illustrative of the compounds of this invention are the following:

N¹-chloroacetoxymethyl-5-chloroindazole,
N¹-bromoacetoxymethyl-5-nitroindazole,
N¹-thiocyanatoacetoxymethyl-5-bromoindazole,
N¹-chloroacetoxymethyl-3,5-dichloroindazole,
N¹-fluoroacetoxymethyl-3-fluoroindazole,
N¹-chloroacetoxymethyl-3-chloro-4-nitroindazole,
N¹-chloroacetoxymethyl-6-nitroindazole,
N¹-thiocyanatoacetoxymethyl-6-chloroindazole,
N¹-thiocyanatoacetoxymethyl-3-chloro-4-nitroindazole,
N¹-iodoacetoxymethyl-3-iodo-4,7-dichloroindazole,
N¹-thiocyanatoacetoxymethyl-3-bromo-4,7-dinitroindazole, and the like.

The most active of these compounds as pesticides are those is which X is chlorine or thiocyanato, Y is chlorine or nitro in the 5 and/or 6 position of the aromatic ring, and Z is hydrogen or chlorine. Examples of these preferred compounds are N¹-chloroacetoxymethyl-5-chloroindazole, N¹-chloroacetoxymethyl-6-nitroindazole, N¹-chloroacetoxymethyl-3-chloro-5-nitroindazole, and N¹-thiocyanatoacetoxymethyl-5-chloroindazole.

The N¹-haloacetoxymethylindazoles of this invention may be prepared by heating the appropriate N¹-hydroxymethylindazole or an amine salt of this indazole with a haloacetyl chloride. This reaction is generally carried out in a solvent, such as benzene, toluene, xylene, acetone, pyridine, ethanol, or ethylene dichloride at the reflux temperature of the reaction mixture. Suitable N¹-hydroxymethylindazoles may be obtained by heating a substituted indazole with paraformaldehyde. The preparation of these compounds is described in detail in my copending applications Ser. No. 589,235 and Ser. No. 689,812 which are now U.S. Pat. No. 3,637,736 and No. 3,641,050. When the N¹-haloacetoxymethyl indazoles are heated with an alkali metal thiocyanate, and preferably potassium thiocyanate, in one of the aforementioned solvents, the N¹-thiocyanatoacetoxymethylindazoles are obtained in a good yield.

The compounds of this invention may be applied to a variety of plant and insect pests to control or inhibit their growth. While each of the N¹-substituted acetoxymethylindazoles has been found to be useful in the control of the growth of at least one type of pest, the particular pest upon which each exerts its major effect is dependent upon the nature of the substituents on the rings. For example, N¹-chloroacetoxymethyl-5-chloroindazole is most effective as a soil fungicide, while N¹-chloroacetoxymethyl-3-chloro-5-nitroindazole is most effective as a postemergence selective herbicide.

The locus in which pest control is to be effected may, if desired, be treated with the compounds of this invention, or the compounds may be applied directly to the organisms whose growth is to be controlled.

While the novel compounds may be used as such in the control of the growth of undesirable organisms, they are usually and preferably used in combination with an inert carrier which facilitates the dispensing of dosage quantities of the compounds and assists in their absorption by the organism. The pesticidal compounds may be mixed with or deposited upon inert particulate solids, such as fuller's earth, talc, diatomaceous earth, hydrated calcium silicate, kaolin, and the like to form dry particulate compositions. Such compositions may, if desired, be dispersed in water with or without the aid of surface-active agents. The pesticidal compounds are preferably dispensed in the form of solutions or dispersions in inert organic solvents, water or mixtures of inert organic solvents and water, or as oil-in-water emulsions. The concentration of the active materials in the pesticidal compositions may vary within wide limits and depends upon a number of factors, the most important of which are the type or types of undesirable organisms being treated and the amount of the composition to be applied. If desired, mixtures of two or more of the novel compounds as well as other pesticidal compounds may be present in the compositions.

The invention is further illustrated by the examples that follow.

EXAMPLE 1

A mixture of 36 grams (0.18 mole) of N¹-hydroxymethyl-6-nitroindazole, 18.9 grams (0.18 mole) of triethylamine, and 400 ml. of benzene was heated at its reflux temperature for 45 minutes. Then a solution of 21.1 grams (0.18 mole) of chloroacetyl chloride in 50 ml. of benzene was added to it, and the reaction mixture was heated at its reflux temperature for 1 hour. It was cooled, allowed to stand overnight, reheated to its reflux temperature, and filtered while hot. The solid product obtained was washed with water and dried. There was obtained 16 grams of N¹-chloroacetoxymethyl-6-nitroindazole, which melted at 158°–161° C. Two additional crops of the product, which totalled 25.2 grams, were recovered from the mother liquor. The three crops were combined and recrystallized from 450 ml. of ethyl acetate. There was obtained 34.6 grams of N¹-chloroacetoxymethyl-6-nitroindazole that melted at 157°–160° C. and that contained 13.35 percent Cl, 16.17 percent N, 45.09 percent C, and 3.43 percent H (calculated, 13.15 percent Cl, 15.55 percent N, 44.4 percent C, and 2.96 percent H). The structure of the compound was confirmed by infrared analysis.

EXAMPLE 2

A mixture of 48.5 grams (0.18 mole) of N¹-chloroacetoxymethyl-6-nitroindazole, 17.6 grams (0.18 mole) of potassium thiocyanate, and 300 ml. of acetone was heated at its reflux temperature for two hours, cooled to room temperature, allowed to stand for 48 hours, and filtered. The N¹-thiocyanatoacetoxymethyl-6-nitroindazole obtained melted at 139–141° C. and contained 11.3 percent S (calculated, 11.0 percent S).

EXAMPLES 3–5

The N¹-(substituted acetoxymethyl)indazoles listed in Table I were prepared by the procedure described in Example 1.

TABLE I

| Ex. No. | Compound | Melting point (° C.) | Analysis (calculated) | |
|---|---|---|---|---|
| | | | Percent N | Percent Cl |
| 3 | N¹-chloroacetoxymethyl-5-chloroindazole. | 98.5–100.5 | 11.6(10.8) | 29.0(27.4) |
| 4 | N¹-chloroacetoxymethyl-5-nitroindazole. | 110–113 | 16.3(15.6) | 12.6(13.2) |
| 5 | N¹-chloroacetoxymethyl-3-chloro-5-nitroindazole. | 105–110 | 15.1(13.8) | 20.2(23.3) |

EXAMPLE 6

Acetone solutions were prepared by dissolving 100 mg. portions of the products of Examples 1–5 in 10 ml. of acetone that contained 2000 p.p.m. of sorbitan trioleate and 5000 p.p.m. of a polyoxyethylene ether of sorbitan monooleate. The acetone solutions were dispersed in 90 ml. portions of distilled water to form aqueous solutions that contained 1000 p.p.m. of the novel compounds. More dilute solutions were prepared by adding distilled water to these solutions.

EXAMPLE 7

A series of tests was carried out in which N¹-(substituted acetoxymethyl)indazoles were evaluated as herbicides. In these tests a group of flats containing seedlings of various plant species was sprayed with an aqueous solution prepared according to the procedure of Example 6. The results of the tests, which were observed 14 days after the application of the test compounds, are reported in Table II. In this table a rating of "0" indicates no effect; "1" to "3" indicates slight injury; "4" to "6" indicates moderate injury; "7" to "9" indicates severe injury; and "10" indicates that all plants were killed.

TABLE II

| | Product of— | | | | |
|---|---|---|---|---|---|
| | Ex. 1 | Ex. 2 | Ex. 3 | Ex. 4 | Ex. 5 |
| Herbicide: Dosage (lb./acre) | 10 | 10 | 20 | 20 | 10 |
| Plant species: | | | | | |
| Clover | 2 | 9 | 9 | 4 | 4 |
| Sugar beets | 6 | 8 | 6 | 10 | 10 |
| Soybeans | 4 | 4 | 6 | 4 | 5 |
| Corn | 4 | 6 | 7 | 4 | 2 |
| Oats | 4 | 2 | 4 | 4 | 4 |
| Mustard | 5 | 4 | 9 | 9 | 10 |
| Morning glory | 8 | 6 | 5 | 4 | 4 |
| Buckwheat | 5 | 7 | 7 | 4 | 2 |
| Crabgrass | 0 | 2 | 5 | 4 | 5 |
| Foxtail | 1 | 4 | 2 | 2 | 6 |

EXAMPLE 8

Separate lots of sterilized soil were inoculated with plant pathogens. The inoculated soil was placed in 4-ounce containers, and the soil in each container was drenched with 30 ml. of an aqueous solution of a fungicide prepared by the process of Example 6. After incubation for two days at 70° F., the amount of mycelial growth on the surface of the soil was noted. The results of these tests are given in Table III. In this table, a rating of "1" indicates growth equal to that in an inoculated soil that had not been treated with a fungicide; "2" indicates that about 75 percent of the surface was covered with colonies of the organism; "3" indicates that about half of the surface was covered with colonies of the organism; "4" indicates that a few colonies were present; and "5" indicates that there was no growth on the surface of the soil.

TABLE III

| | | Plant pathogen | | | |
|---|---|---|---|---|---|
| Biocide | Rate (lbs/. acre) | Sclerotium rolfsii | Pythium sp. | Rhizoctonia solani | Fusarium oxysporum |
| Product of— | | | | | |
| Example 2 | 300 | 5 | 3 | 1 | 4 |
| Example 3 | 300 | 5 | 4 | 5 | 5 |
| Example 4 | 300 | 5 | 4 | 1 | 2 |
| Example 5 | 300 | 3 | 4 | 1 | 3 |

Each of the other N¹-(substituted acetoxymethyl)indazoles herein disclosed can be used in a similar way in the control of undesired plants and fungi.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A compound having the structural formula

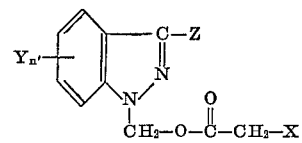

wherein X represents halogen or thiocyanato; Y represents halogen or nitro; Z represents hydrogen or halogen; and $n'$ represents an integer in the range of 1 to 2.

2. The compound as set forth in claim 1 that is N¹-chloroacetoxymethyl-5-chloroindazole.

3. The compound as set forth in claim 1 that is N¹-chloroacetoxymethyl-6-nitroindazole.

4. The compound as set forth in claim 1 that is N¹-thiocyanatoacetoxymethyl-6-nitroindazole.

5. The compound as set forth in claim 1 that is N¹-chloroacetoxymethyl-3-chloro-5-nitroindazole.

References Cited

FOREIGN PATENTS 1,568,790    4/1969    France _____ 260—310 C

OTHER REFERENCES

Pozharskii et al.: J. Gen. Chem. (U.S.S.R.), vol. 34, pp. 3409–11 (1964).

NATALIE TROUSOF, Primary Examiner

U.S. Cl. X.R.

71—92; 424—273